United States Patent [19]
Arai et al.

[11] Patent Number: 5,009,818
[45] Date of Patent: Apr. 23, 1991

[54] METHOD OF MANUFACTURING AN OPTICAL INFORMATION RECORDED DISC

[75] Inventors: Yuji Arai; Yuaki Shin; Takashi Ishiguro; Emiko Hamada, all of Tokyo, Japan

[73] Assignee: Taiyo Yuden Co., Ltd., Tokyo, Japan

[21] Appl. No.: 433,675

[22] Filed: Nov. 7, 1989

[30] Foreign Application Priority Data

Dec. 30, 1988 [JP] Japan .................. 63-335344

[51] Int. Cl.$^5$ ............... B29C 39/20; B29C 45/16
[52] U.S. Cl. .................. 264/1.003; 264/1.004; 264/1.009; 264/22; 264/106; 264/135; 425/810
[58] Field of Search ............ 264/106, 107, 1.3, 1.4, 264/22, 1.9, 135; 425/810; 428/65; 427/155, 156, 307, 163, 54.1

[56] References Cited

U.S. PATENT DOCUMENTS

| | | | |
|---|---|---|---|
| 4,477,328 | 10/1984 | Broeksema | 264/107 |
| 4,478,768 | 10/1984 | Takeoka | 264/107 |
| 4,565,772 | 1/1986 | Takeoka | 264/107 |
| 4,615,753 | 10/1986 | Gregg | 264/107 |
| 4,659,407 | 4/1987 | Lacotte | 264/107 |
| 4,761,253 | 8/1988 | Antes | 264/1.3 |
| 4,764,331 | 8/1988 | Tokuhara | 264/106 |
| 4,790,893 | 12/1988 | Watkins | 264/106 |
| 4,810,547 | 3/1989 | Minami | 264/106 |
| 4,876,042 | 10/1989 | Imataki | 264/106 |
| 4,888,201 | 12/1989 | Vennvliet | 264/1.3 |

Primary Examiner—Jay H. Woo
Assistant Examiner—Jeremiah F. Durkin
Attorney, Agent, or Firm—Flynn, Thiel, Boutell & Tanis

[57] ABSTRACT

A method of manufacturing an optical information recorded disc. The method includes steps of forming a light-absorbing layer and a protective layer on a substrate, irradiating a laser through the substrate on the light-absorbing layer to form reproducible information which can be reproduced by a reproducible signal satisfying a standard of a compact disc.

21 Claims, 5 Drawing Sheets

METHOD OF MANUFACTURING AN OPTICAL INFORMATION RECORDED DISC

BACKGROUND OF THE INVENTION

1. Field of the Invention

The present invention relates to a method of manufacturing an optical information recorded disc in which an information signal has been previously stored, particularly to the method for manufacturing an optical information disc satisfying the standards of a compact disc (hereinafter referred to as CD standards).

2. Description of the Prior Art

An optical information recorded disc in which an information signal has been previously stored and satisfying the CD standards is manufactured by the following steps.

MASTER FORMING STEP

Figure 4:
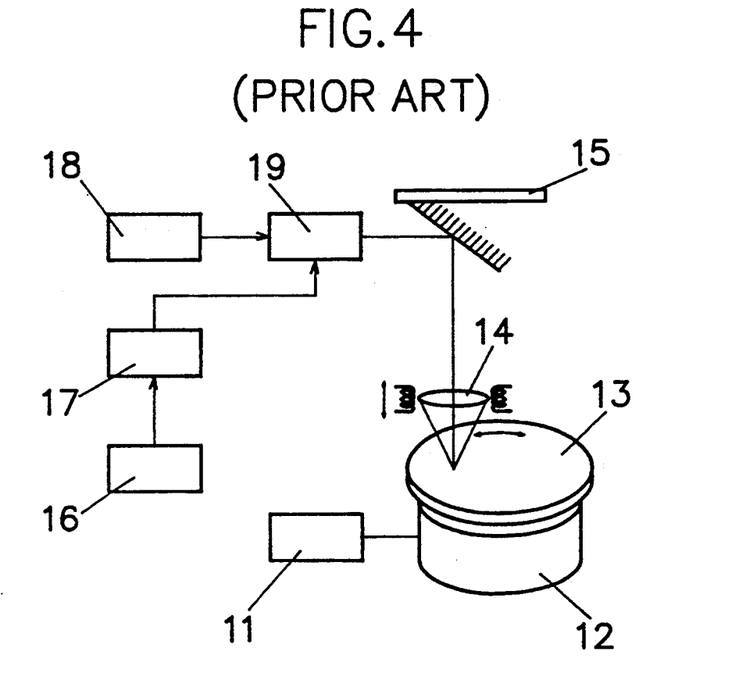
FIG. 4 is a view showing a master forming step in the conventional method of manufacturing the information recorded disc.

As shown in FIG. 4, a photoresist is first applied uniformly on a grinded surface of an original glass substrate 13 by spin coating or the like to form a photoresist film. A laser light or spot, such as an Ar-laser or He-Cd laser or the like, is then irradiated onto the photoresist film from a pickup 14 including an object lens while the glass substrate 13 is turned by a spindle motor 12 so that the photoresist film is exposed to the laser spot. At this time, the pickup 14 is moved by a feeding mechanism in the radial direction of the original glass substrate 13 at the speed, of 1.6 μm per one turning of the spindle motor 12. The speed of revolution of the spindle motor 12 is controlled by a controller 11 to correspond to the speed of revolution determined by the positional relationship of the pickup over the glass substrate 13. The laser spot is modulated by a modulator 19 in response to a signal issued by a CD signal generator 17 on the basis of the information from a data source 16 and is irradiated on the photoresist film. The exposed photoresist film is then developed to obtain the master.

METAL MASK FORMING STEP

A metal mask is formed on the basis of the master after subjecting it to a plating process. A plurality of metal mothers are formed from the metal masks and a plurality of stampers are formed from the metal mothers.

SUBSTRATE FORMING STEP

Figure 5:
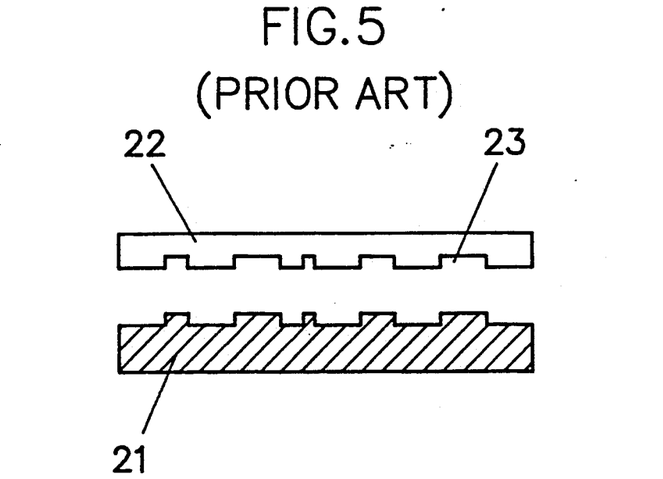
FIG. 5 is a view showing transmitting substrate forming step in the conventional method of manufacturing the information recorded disc.

A substrate is formed having pits 23, 23 . . . transferred and formed thereon on the basis of the stamper 21 as shown in FIG. 5 by an appropriate molding such as injection molding, or injection-compression molding.

LIGHT-REFLECTING LAYER FORMING STEP AND PROTECTIVE LAYER FORMING STEP

A metal film is deposited on the substrate 22 by sputtering or vacuum evaporation, or some other suitable deposition method. The metal film is covered by a protective layer of an ultraviolet hardened resin or the like to thereby form the compact disc.

The method set forth above is adapted for the mass-production of an information recorded disc of the same type. However, there are shortcomings in their method in that it has complicated steps for forming the master and thereafter forming the stamper, and it is very expensive when manufacturing a small number of information recorded discs.

SUMMARY OF THE INVENTION

It is an object of the present invention to provide a method capable of manufacturing a small number of information recorded discs with ease.

To achieve the above object, the method of manufacturing the information recorded disc, storing therein the information which can be read out by optical means, comprises the steps of forming a light absorbing layer on a light-transmitting substrate having tracking guide means provided thereon along which a laser spot irradiated from an optical pickup travels, forming a light-reflecting layer over the light-absorbing layer, forming a protective layer over the light-reflecting layer, irradiating a laser spot on the light-absorbing layer from the direction of the light-transmitting substrate for thereby recording a reproducible signal satisfying CD standards.

The above and other objects, features and advantages of the present invention will become more apparent from the following description taken in conjunction with the accompanying drawings.

DESCRIPTION OF THE PREFERRED EMBODIMENT

A preferred embodiment of a method of manufacturing the optical information disc according to the present invention will now be described.

FIRST STEP: PREPARING A LIGHT-TRANSMITTING SUBSTRATE

Figure 1:
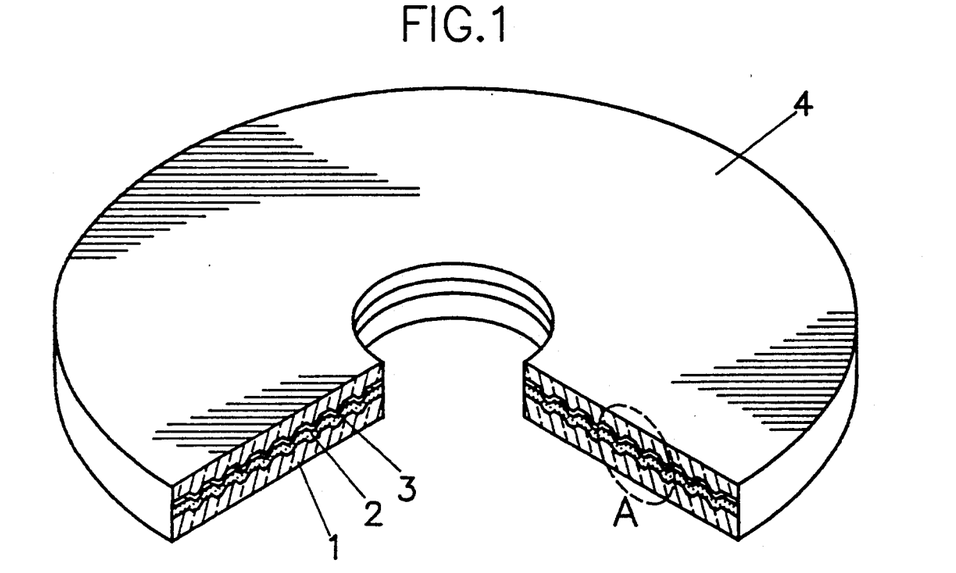
FIG. 1 is a perspective sectional view showing an arrangement of an information recorded disc manufactured according to the present invention.

A light-transmitting substrate 1 is formed of a material of high transparency having a refractive index of 1.4 to 1.6 relative to the wavelength of a laser light and high impact strength, such as a polycarbonate, an acrylate, or an epoxy resin, and, in certain cases by a glass plate. A solvent resistant layer, such as $SiO_2$ etc., and an enhancing layer may be coated on the light-transmitting substrate 1. The thickness of the light-transmitting substrate is preferably within the range of 1.1 mm to 1.5 mm, satisfying CD standards. Tracking guide means are formed over the surface of the light-absorbing layer side of the light-transmitting substrate 1. The tracking guide means may comprise address pits composed of pits formed at predetermined intervals, so-called sample servos, but may desirably comprise a groove formed spirally. The spiral groove 6 is used in association with tracking so as to record the information signal. The spiral groove 6 preferably has a depth of 0.03 to 0.20 $\mu$m but is not limited to these values. The spiral groove 6 desirably has a width of 0.3 to 1.3 $\mu$m. The pitch of the groove 6, namely, the tracking pitch, is desirably 1.6 $\mu$m. The tracking means of the groove may be formed as edges wherein identical clocking and time code information is stored.

SECOND STEP: FORMING A LIGHT-ABSORBING LAYER

Successively, a light-absorbing layer 2 is formed on the surface of the light-transmitting substrate at the side where the tracking guide means is provided.

The light-absorbing layer 2 is exothermic, molten, evaporated, sublimated, deformed or varied by the laser spot irradiated at the cutting step. The light-absorbing layer 2 is formed on the surface of the light-transmitting substrate, for example, by uniformly coating thereon cyanine dye and or the like, dissolved in a solvent by the use of a spin coating method or the like. An enhanced layer may be coated on the light-absorbing layer 2.

Materials to be used in the light-absorbing layer 2 are desirably an organic dye, having light-absorbing characteristics as exemplified by dyes of polymethine, triarylmethane, pyrilium, phenanthrene, tetradehydrocholine, triarylamine, squalilium, croconic methine, merocyanine, cyanine, or the like but are not limited thereto insofar as the materials may be a known optical information recorded material which achieves the object of the present invention. The light-absorbing layer comprising the cyanine dyes can set the values of a real part $n_{abs}$ and an imaginary part $k_{abs}$ respectively of the complex refractive index with ease to thereby obtain a reproduction signal having high reflection and high modulation ratio whereby an optical information recorded disc satisfying CD standards can be obtained with ease.

If the light-absorbing layer 2 includes the cyanine dyes, it may include dyes resins, e.g. thermoplastic resin such as nitrocellulose, etc., an elastomer, a liquid rubber etc.

If the light-absorbing layer 2 includes the organic dyes, it is formed by coating the surface of the light-transmitting substrate 1 with the organic dye dissolved in an organic solvent such as acetylacetone, methyl cellosolve, toluene or another organic solvent. The light-absorbing layer can be formed, for example, by evaporation, an LB method, spin coating or the like. Among them, spin coating is preferable since the thickness of the light-absorbing layer 2 can be controlled by adjusting of the density of coating material, viscosity and drying speed of the solvent. If the light-absorbing layer 2 is not an organic dye, it can be formed by evaporation, sputtering or another known forming method.

THIRD STEP: FORMING A LIGHT-REFLECTING LAYER

Successively, a light-reflecting layer 3 is formed on the light-absorbing layer 2.

The light-reflecting layer 3 is a metal layer and formed by coating Au, Ag, Cu, Al, and alloys including those metals, by evaporation, sputtering, etc. on the light-absorbing layer 2. It is preferable that the metal film including Au or Ag because of their high reflectance.

FOURTH STEP: FORMING A PROTECTIVE LAYER

A protective layer 4 is formed on the light reflecting layer 3.

The protective layer 4 is formed by a resin having an impact strength the same as the light-transmitting substrate 1. The resin is hardened by exposure to ultraviolet light to form a so-called UV hardened resin. The UV hardened resin is coated on light-reflecting layer 3 by the spin coating. An epoxy resin, or an acrylate resin, a silicon-group hard coating resin may also be employed as the protective layer 4.

It is desirable that the optical information recorded disc according to the present invention is provided with the layers disposed on the side of the light-absorbing layer 2 opposite to the light-transmitting substrate 1 such as the light-reflecting layer 3 or the protective layer 4 and the like which are formed by materials having physical properties of high temperature thermometamorphosis and of high hardness compared with the layer where the optical pits 7 are formed. Forming the rear layers of a material having such high hardness contributes to reduction of the block error rate in the recorded signal prescribed in the CD standards.

It is possible to interpose an oxidation resistant layer between the light-reflecting layer 3 and the protective layer 4.

The optical information recorded disc employed in the present invention will be described more in detail.

Figure 6:
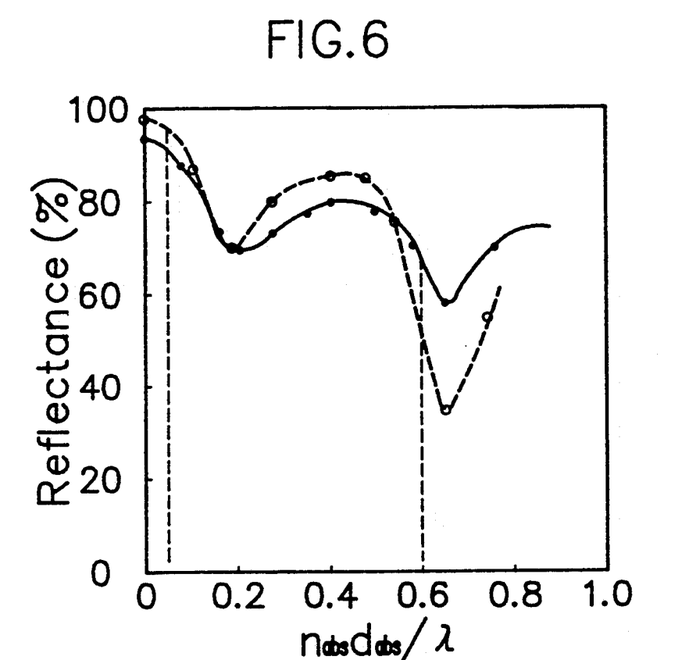
FIG. 6 is a graph showing relationship, according to a computer simulation, between a complex refractive index of a light-absorbing layer and the wavelength expressed as $\rho = n_{abs} d_{abs}/\lambda$ and the reflectance of a blank disc employed in the present invention.

FIG. 6 illustrates the relationship between the equation $\rho = n_{abs} d_{abs}/\lambda$ and the reflectance of the light incident from the side of the substrate, assuming that $n_{abs}$ is a real part of the complex refractive index of the light-absorbing layer of the blank disc before it is subjected to the cutting step, $d_{abs}$ is the thickness of the light-absorbing layer, and $\lambda$ is a wavelength of the reproduction light.

The graph represents a function of a combination of a exponential function and a periodic function and hence, the larger the value $\rho$, the larger the amplitude of the periodic function.

The amplitude of the periodic function is changed with the parameters of complex refractive index, thickness and uniformity of the layers composing the optical information recorded disc. For example, if, the complex refractive index of the layers disposed on the incident side of the light absorbing layer 2 is small, the reflectance is high. The graph represents an exponential function, having parameters of $k_{abs}$ and $d_{abs}$ and hence are larger than the imaginary part of the complex refractive index of the light-absorbing layer and larger than the damping of the reflectance.

Provided that the light-absorbing layer is uniform, and there is no irregular distribution in the real part of $n_{abs}$ of the complex refractive index and thickness of $d_{abs}$, there is no variation in a period showing a peak point in the graph according to the simulation made by the present inventors.

It is possible to increase the reflectance of the bottom point in the graph by controlling the condition of the parameter. However, if $p$ is set to be near the bottom point, it is difficult to increase the modulation amplitude and there is a likelihood that the reflectance is increased compared with the case before the information is stored, in the optical information recorded disc. Accordingly, $p$ is desirably set near the peak point.

It is found from the simulation made by the present inventors that the value p is set within the range of 0.05 to 1.6 whereby the reflectance becomes at least 70%, thereby satisfying CD standards.

If the value $p$ is less than 0.05 the thickness of the light-absorbing layer is set to be less than 0.05 $\mu$m which is not practical in manufacturing thereof. Accordingly, the value $p$ is preferable between 0.05 to 0.6, with 0.3 to 0.5 being most preferable.

Even if the value $p$ exceeds 0.6, which is not illustrated but within the peak point, it is possible that the reflectance exceeds 70%. There are two peak points in the range of $0.6 < p < 1.6$, the first peak point is always in the range of $0.6 < p < 1.10$ and the second peak point is always in the range of $1.10 < p < 1.6$. High reflectance can be achieved at both peak points. In the range of $1.6 \leq p$, the film of the light-absorbing layer is thick hence the control of the film thickness of the light-absorbing layer, becomes difficult which is not practical during the manufacturing thereof.

The solid line in FIG. 6 shows a variation of reflectance when the value $p$ is varied in the range of 0 to 0.8 by varying the thickness dabs of the thickness of the light-absorbing layer when the light-absorbing layer of the blank disc is formed by dissolving 1,1'-dibutyl-3,3,3',3'-tetramethyl-4,5,4', 5'-dibenzoidodicarbo cyanine perchlorate (Nihon Kanko Shikiso K.K. product no. NK3219) into 10 cc of diacetone alcohol, and coating the resultant solution on the polycarbonate substrate by the spinner coating method. In the same figure, the dotted line shows a variation of reflectance when the value p is varied in the range of 0 to 0.8 when the light-absorbing layer is formed by sputtering a GaAs film on the polycarbonate substrate.

A translucent characteristic of the light-absorbing layer is satisfactorily assured so that the blank disc has the reflectance set forth above.

Figure 7:
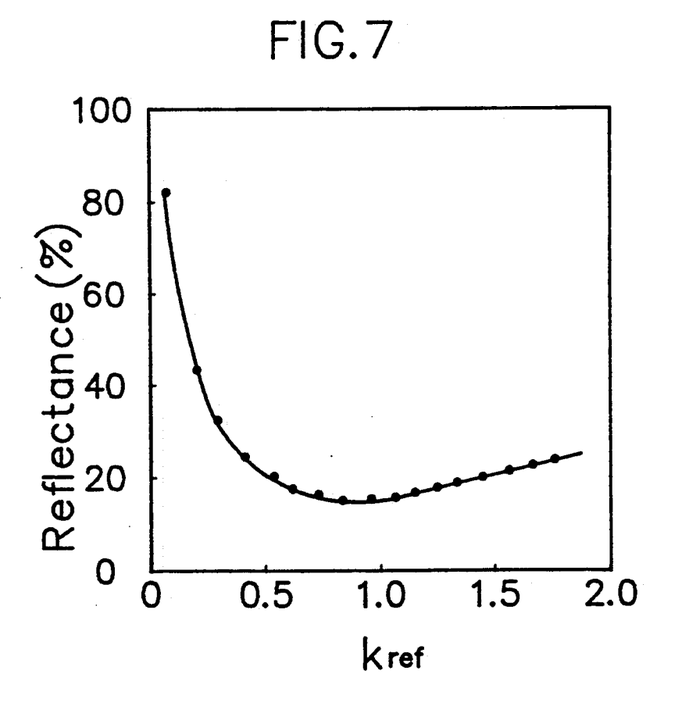
FIG. 7 is a graph showing a relationship according to a computer simulation between an imaginary part of the complex refractive index $k_{abs}$ of the light-absorbing layer and the reflectance.

FIG. 7 illustrates the reflectance when an imaginary part of the complex refractive index $k_{abs}$ is varied from the value near 0 to 2.0 while the real part $n_{abs} = 2.4$ and the translucent characteristic of the light-absorbing layer formed by cyanine dyes in the blank disc having a light-reflecting layer employing an Au film is varied.

To keep the high reflectance under the condition set forth above, the light-absorbing layer has high transparency and the imaginary part $k_{abs}$ of the complex refractive index is preferable less than 0.3.

Figure 8:
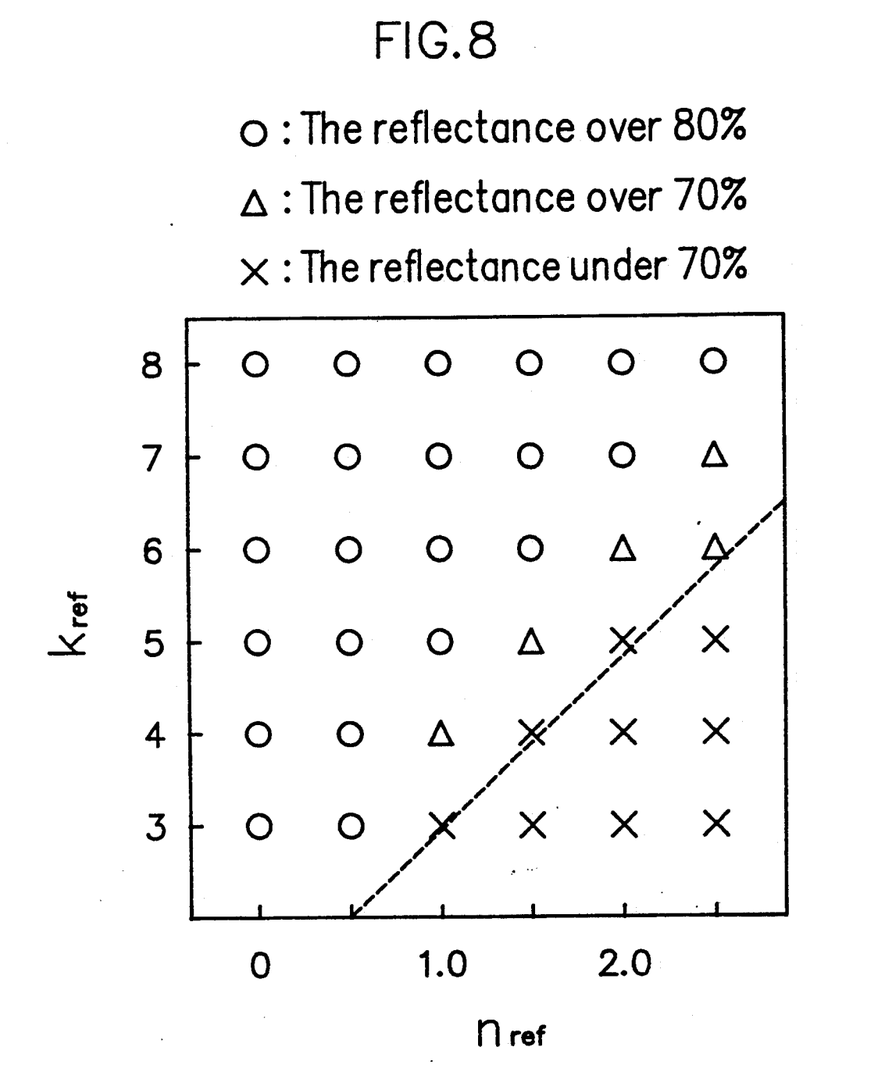
FIG. 8 is a graph showing the relationship between the complex refractive index of the light-reflecting layer having a real part $n_{ref}$ and an imaginary part $k_{ref}$ and the reflectance.
Figure 9:
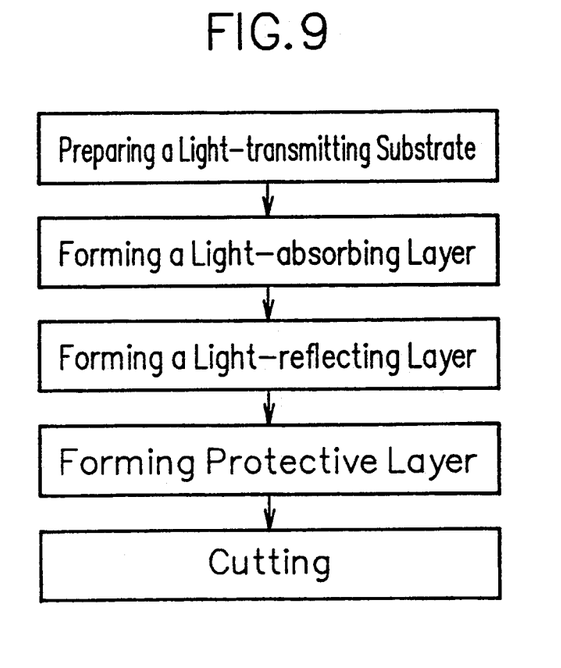
FIG. 9 is a view showing the steps of manufacturing the information recorded disc of the present invention.

FIG. 8 is a graph showing a reflectance of the light incident from the when the real part $n_{ref}$ and the imaginary part $k_{ref}$ of the complex refractive index of the light-reflecting layer are varied under the condition that the complex refractive index has the real part $N_{ref} = 1.5$ to 3 and the imaginary part $k_{abs} \leq 3$ when the semiconductor laser has a wavelength $\lambda = 780$ nm as the reproduction light. As evident from the graph, the relationship between the real part and the imaginary part of the complex refractive index is expressed as $k_{ref} \geq 2 n_{ref} + 0.8$ for thereby obtaining the light information having a reflectance exceeding 70%.

FIFTH STEP: CUTTING

The optical information recorded disc according to the present invention can be manufactured by use of the disc thus prepared and having the arrangement set forth above in the following manner.

Figure 10:
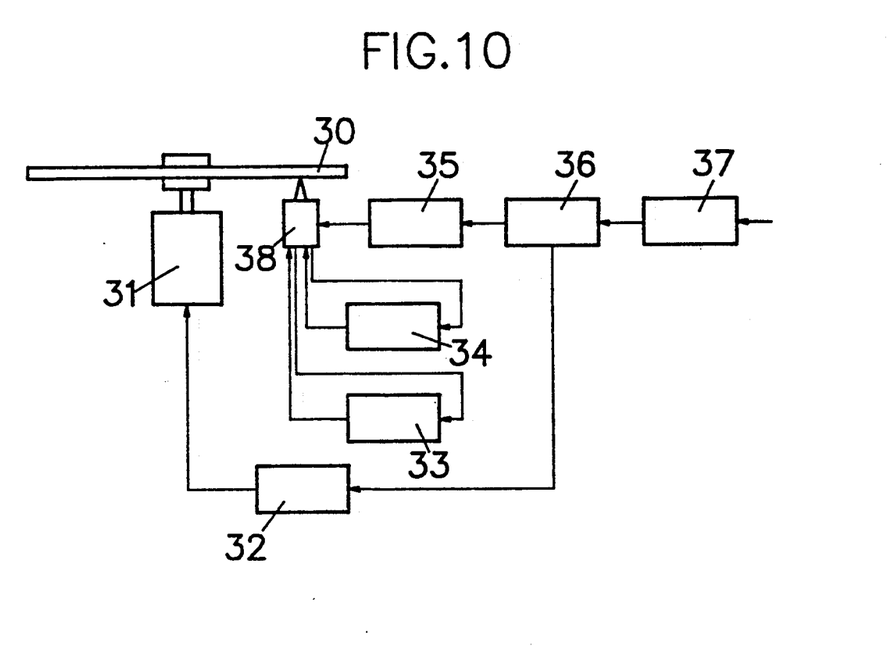
FIG. 10 is a schematic view of an apparatus for manufacturing the optical information disc.

As shown in FIG. 10, a blank disc 30 is clamped by a spindle of the spindle motor 31 and rotated by the spindle motor 31. An optical pickup 38 is disposed under the disc 30 and the laser spot focused by the pickup 38 is irradiated on the disc 30. An information to be recorded is converted from analog signal to a digital signal by A/D converter 37 and thereafter modulated by a signal processing unit into EFM (eight to fourteen modulation) signal adapted to a CD format by modulater 36. The EFM signal is rectified by a wave rectifier 35 and thereafter applied to an optical pickup 38 whereby a laser beam is emitted from the optical pickup 38 on the basis of the signal of the information to be recorded. At the same time, the optical pickup 38 is servo feed controlled to be focused by a focus servo feed controller 34 so that the laser beam can be focused onto the light-absorbing layer and irradiated through the light-transmitting substrate. The optical pickup 38 is simultaneously servo feed controlled to be tracked by a tracking servo feed controller 33 in response to the tracking guide means, for example, in response of a pregroove. More in detail, the pregroove is a spiral groove having a pitch of 1.6 $\mu$m every one turn of the disc 30. The laser spot to be tracked along the pregroove are moved radially 1.6 $\mu$m every one turn of the disc 30. Furthermore, the speed of revolution of the spindle motor 31 is servo feed controlled by a rotary servo feed controller 32 to the speed of revolution determined by the position of the optical pickup 38 over the disc 30.

With such an arrangement, the pits are formed on the disc 30 along the pregroove as the tracking means and the information is recorded. The information recorded in the disc can be reproduced by the compact disc player on the market.

According to the present invention, the laser spot preferably has a wavelength 780 nm. Relative to CD standards, the linear speed is preferably 1.2 to 1.4 m/sec. That is, the information can be recorded with the use of a writer in which the power at the time of recording the information is greater than that at the time of reproduction of the information using the CD player on the market.

Figure 2:
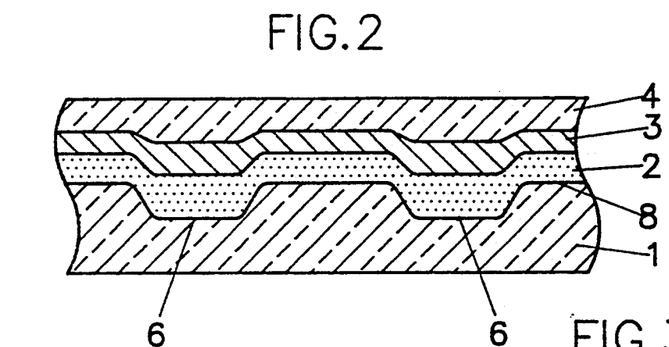
FIG. 2 is an enlarged view of portion A shown in FIG. 1 and showing a section where a cutting step begins.

In this case, it is desirable to form optical pits 7 by irradiating the laser to the inside of the groove 6 when land portions 8 among the groove are optically bright in view of the condition of the film thickness of the light-absorbing layer. It is desirable to form the optical pits 7 by irradiating the laser to the land portions 8 when the inside of the groove 6 is optically bright.

Figure 3:
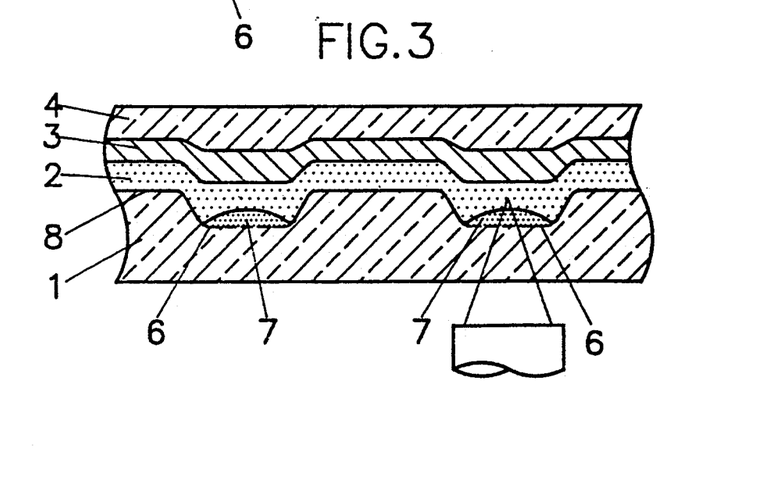
FIG. 3 is an enlarged view of portion A as shown in FIG. 1 and showing a section where the cutting step is completed.

FIG. 3 illustrates a section where the surface of the substrate on which the optical pits 7 are formed is partially deformed.

It is therefore possible to easily manufacture an optical information recorded disc capable of reproducing a signal which satisfy the CD standards, namely, a CD which can be reproduced by a compact disc player on the market.

DESCRIPTION OF THE PREFERRED EMBODIMENT

First Embodiment

A polycarbonate substrate 1 is formed by the injection molding method having a thickness of 1.2 mm, an outer diameter 120 mm$\phi$, an inner diameter of 15 mm$\phi$ and having a spiral groove having a width of 0.8 $\mu$m, depth of 0.08 $\mu$m, a pitch of 1.6 $\mu$m on the substrate 1 within the range of the outer diameter of 46 to 117 mm$\phi$.

The light-absorbing layer 2 is formed by dissolving an organic dye composed of 1,1'-dibutyl-3,3,3',3'-tetramethyl-4,5,4',5'-dibenzoidodicarbocyanine perchlorate (Nihon Kanko Shikiso K.K. product no. NK3219) and having weight of 0.65 g into 10 cc of diacetone alcohol and applying the resultant solution on the substrate 1 by the spin coating for thereby forming the light-absorbing layer 2 having a dye film of the thickness of 0.13 $\mu$m. The complex refractive index of the light-absorbing layer has the real part $n_{abs}=2.7$ and the imaginary part $k_{abs}=0.05$. The wavelength $\lambda$ of the semiconductor laser of the reproducing light is 780 nm and the value $\rho=n_{abs}d_{abs}/\lambda=0.45$.

An Au film having the film thickness of 500 Å is coated on the entire surface of the disc by sputtering to form the light-reflecting layer 3. The complex refractive index of the light-reflecting layer has the real part $n_{ref}=0.16$ and the imaginary part $k_{ref}=4.67$. The light-reflecting layer 3 is coated with the ultraviolet hardened resin by spin coating and the ultraviolet hardened resin is irradiated and hardened by the ultraviolet rays whereby the protective layer 4 having a thickness of 10 $\mu$m is formed on the light-reflecting layer.

The thus formed disk is irradiated by a semiconductor laser spot having a wavelength of 780 nm, linear speed of 1.2 m/sec, the and power recording of 6.0 mW while it is subjected to tracking along the pregroove so that various data are stored in the disc at predetermined positions of the disc. That is, TOC (table of contents) data are stored in the disc in the range of 46 to 50 mm of the diameter thereof and program data are stored in the disc in the range of 50 to 100 mm of the diameter thereof and read/out data are stored in the disc in the range of 100 to 102 mm of the diameter thereof. The data thus stored can be reproduced by a CD player on the market (Aurex XR-V73, wavelength of the reproducible light $\lambda=780$ nm) to obtain a reproduced signal. The reflectance of the optical information disk is 74%, I 11/I top is 73%, I3/I top is 57%, block error rate is $2.5 \times 10^{-3}$ satisfying the CD standards which requires the reflectance being over 70%, I11/I top being over 60%, and I3/I top being 30 to 70%.

Second Embodiment

The light-absorbing layer 2 is formed by dissolving an organic dye composed of 1,1'-diethyl-3,3,3',3'-tetramethyl-5,5'-diethoxyindodicarbocyanine iodide and having a weight of 0.5 g into 10 cc of isopropyl alcohol and applying the resultant solution on the substrate 1 manufactured in the same way as the first embodiment by spin coating for thereby forming a light-absorbing layer 2 having a dye film of a thickness of 0.10 $\mu$m. The complex refractive index of the light-absorbing layer has the real part $n_{abs}=2.65$ and the imaginary part $k_{abs}=0.05$. The wavelength $\lambda$ of the semiconductor laser of the reproducible light is 780 nm and the value $\rho=n_{abs}d_{abs}/\lambda=0.34$.

A Cu film having the film thickness of 500 Å is coated on the entire surface of the disc by sputtering to form the light-reflecting layer 3. The complex refractive index of the light-reflecting layer 3 has the real part $n_{ref}=0.12$ and the imaginary part $k_{ref}=4.89$. The light-reflecting layer 3 is coated with the ultraviolet hardened resin by spin coating and the ultraviolet hardened resin is irradiated and hardened by ultraviolet rays whereby a protective layer having a thickness of 10 $\mu$m is formed on the light-reflecting layer.

The thus formed disk is subjected to a cutting process while it is irradiated by a semiconductor laser spot in the same way as in the first embodiment. The data thus stored can be reproduced by the CD player used in the first embodiment to obtain reproduced signal having substantially the same pattern as the first embodiment. The reflectance of the optical information disk is 71%, I 11/I top is 63%, I3/I top is 33% which satisfies the CD standards same as the first embodiment.

Third Embodiment

A GaAs film is formed on the polycarbonate substrate 1 manufactured in the same way as the first embodiment for thereby forming the light-absorbing layer 2. The complex refractive index of the light-absorbing layer has the real part $n_{abs}=3.6$ and the imaginary part $k_{abs}=0.07$ and the value $\rho=n_{abs}d_{abs}/\lambda=0.42$.

An Ag film having a film thickness of 450 Å is coated on the entire surface of the disc by sputtering to form the light-refracting layer 3. The complex refractive index of the light-reflecting layer has the real part $n_{ref}=0.086$ and the imaginary part $k_{ref}=5.29$. The light-reflecting layer 3 is coated with the ultraviolet hardened resin by spin coating and the ultraviolet hardened resin is irradiated and hardened by a ultraviolet rays whereby protective layer having the thickness of 10 $\mu$m is formed on the light-reflecting layer.

The thus formed blank disk is subjected to a cutting process while it is irradiated by the semiconductor laser spot in the same way as in the first embodiment. The data thus stored can be reproduced by the CD player used in the first embodiment to obtain a reproduced signal having substantially the same pattern as the first embodiment. The reflectance of the optical information disc is 73%, I 11/I top is 63%, I3/I top is 35% satisfying the CD standards the same as the first embodiment.

It is possible to manufacture the optical information disc capable of obtaining a reproduction signal satisfying CD standards by preparing the disc, irradiating the laser spot on the light-absorbing layer, and thereafter subjecting the light-absorbing layer to the cutting step with the elimination of the conventional step for forming the master and thereafter forming the stamper. When a small number of CD's are manufactured, the step of irradiating the laser spot on the light-absorbing layer after forming the disc and thereafter subjecting the light-absorbing layer to the cutting step is more advantageous than the step of forming the master and thereafter forming the stamper.

Although the invention has been described in its preferred form with a certain degree of particularlity, it is to be understood that many variations and changes are possible in the invention without departing from the scope thereof.

What is claimed is:

1. A method of manufacturing an optical information recorded disc having an information stored therein an reproducible by an optical means, the method comprising the steps of:
   (a) preparing a discoidal light-transmitting substrate having tracking guide means on a surface thereof;
   (b) forming a light-absorbing layer on the surface of the light-transmitting substrate;
   (c) forming a light-reflecting layer on the light-absorbing layer;
   (d) forming a protective layer on the light-reflecting layer; and
   (e) irradiating the light-absorbing layer through the light-transmitting substrate and along the tracking guide means with a laser so as to form pits for reproducing the information.

2. A method of manufacturing an optical information recorded disc according to claims 1, wherein the tracking means formed on the light-transmitting substrate is a spiral groove formed by injection molding.

3. A method of manufacturing an optical information recorded disc according to claim 1, wherein the light-transmitting substrate is formed by injection molding.

4. A method of manufacturing an optical information recorded disc according to claim 2, wherein the light-transmitting substrate is formed of a polycarbonate which is subjected to injection molding.

5. A method of manufacturing an optical information recorded disc according to claim 1, wherein the light-absorbing layer is formed by spin coating.

6. A method of manufacturing an optical information recorded disc according to claim 1, wherein the light-absorbing layer is formed with organic dyes which are subjected to spin coating method.

7. A method of manufacturing an optical information recorded disc according to claim 1, wherein the light-absorbing layer is formed with a cyanine dyes which are subjected to spin coating.

8. A method of manufacturing an optical information recorded disc according to claim 1, wherein the light-reflecting layer is formed by Au which is subjected to a film forming step.

9. A method of manufacturing an optical information recorded disc according to claim 1, wherein the protective layer is formed by spin coating.

10. A method of manufacturing an optical information recorded disc having an information stored therein and reproducible by an optical means, the method comprising the steps of:
   (a) preparing a discoidal light-transmitting substrate having tracking guide means on one surface;
   (b) forming a light-absorbing layer on the surface of the light-transmitting substrate;
   (c) forming a light-reflecting layer on the light-absorbing layer, the light-reflecting layer having a complex refractive index having a real part $n_{ref}$ and an imaginary part $k_{ref}$ which is expressed as $k_{ref} \geq 2n_{ref} + 0.8$;
   (d) forming a protective layer on the light-reflecting layer; and
   (e) irradiating the light-absorbing layer through the light-transmitting substrate and along the tracking guide means with a laser.

11. A method of manufacturing an optical information recorded disc according to claim 10, wherein the light-reflecting layer is formed by Au which is subjected to a film forming step.

12. A method of manufacturing an optical information recorded disc according to claim 10, wherein the protective layer is formed by spin coating.

13. A method of manufacturing an optical information recorded disc having an information stored therein and reproducible by an optical means, the method comprising the steps of:
   (a) preparing a discoidal light-transmitting substrate having tracking guide means on one surface;
   (b) forming a light-absorbing layer on the surface of the light-transmitting substrate;
   (c) forming a light-reflecting layer on the light-absorbing layer;
   (d) forming a protective layer on the light-reflecting layer, the protective layer being formed by coating an ultraviolet hardening resin on the light-reflecting layer by a spinner coating method, and by irradiating the ultraviolet on the ultraviolet hardening resin and thereafter hardening the ultraviolet hardening resin; and
   (e) irradiating at the light-absorbing layer through the light-transmitting substrate and along the tracking guide means with a laser.

14. A method of manufacturing an optical information recorded disc having an information stored therein and reproducible by an optical means, the method comprising the steps of:
   (a) preparing a discoidal light-transmitting substrate having spiral groove on one surface;
   (b) forming a light-absorbing layer on the surface of the light-transmitting substrate;
   (c) forming a light-reflecting layer on the light-absorbing layer;
   (d) forming a protective layer on the light-reflecting layer; and
   (e) irradiating a laser on the light-absorbing layer through the light-transmitting substrate along the spiral groove with a laser so as to form optical pits between the spiral groove for reproducing the information.

15. A method of manufacturing an optical information recorded disc having an information stored therein and reproducible by an optical means, the method comprising the steps of:
   (a) preparing a discoidal light-transmitting substrate having spiral groove on one surface;
   (b) forming a light-absorbing layer on the surface of the light-transmitting substrate;
   (c) forming a light-reflecting layer on the light-absorbing layer;
   (d) forming a protective layer on the light-reflecting layer; and
   (e) irradiating the light-absorbing layer through the light-transmitting substrate and along the spiral groove with a laser so as to form optical pits in the spiral groove for reproducing the information.

16. A method for manufacturing an optical information recorded disc having an information stored therein and reproducible by an optical means, the method comprising the steps of:
   (a) preparing a discoidal light-transmitting substrate having tracking guide means on one surface;
   (b) forming a light-absorbing layer on the surface of the light-transmitting substrate, wherein an optical parameter represented by $\rho = n_{abs} d_{abs} \lambda$, where $n_{abs}$ is the real part of the complex refractive index of the light-absorbing layer, $d_{abs}$ is the thickness of the light-absorbing layer and $\lambda$ is the wavelength of a reading laser beam, is $0.05 \geq \rho \geq 0.6$, and the imaginary $k_{abs}$ of the complex refractive index of the light absorbing layer is at most 0.3;
(c) forming a light-reflecting layer on the light-absorbing layer;
(d) forming a protective layer on the light-reflecting layer; and
(e) irradiating the light-absorbing layer through the light-transmitting substrate and along the tracking guide means with a laser.

17. A method of manufacturing an optical information recorded disc according to claim 16, wherein the light-absorbing layer is formed by spin coating.

18. A method of manufacturing an optical information recorded disc according to claim 16, wherein the light-absorbing layer is formed with an organic dye which is subjected to spin coating.

19. A method of manufacturing an optical information recorded disc according to claim 16, wherein the light-absorbing layer is formed with a cyanine dye which is subjected to spin coating.

20. A method of manufacturing an optical information recorded disc according to claim 16, wherein the light-reflecting layer is formed by Au which is subjected to a film forming step.

21. A method of manufacturing an optical information recorded disc according to claim 16, wherein the protective layer is formed by spin coating.

* * * * *

UNITED STATES PATENT AND TRADEMARK OFFICE
CERTIFICATE OF CORRECTION

PATENT NO. : 5 009 818
DATED      : April 23, 1991
INVENTOR(S): Yuji ARAI et al

It is certified that error appears in the above-identified patent and that said Letters Patent is hereby corrected as shown below:

Column 9, line 18; change "claims" to ---claim---.

line 38; before "cyanine" delete "a".

Column 10, line 21; after "irradiating" delete "at".

line 36; delete "a laser on".

line 37; after "substrate" insert ---and---.

line 65; change " $\rho = n_{abs}\ d_{abs}\lambda$ " to
--- $\rho = n_{abs}\ d_{abs}\ /\ \lambda$ ---.

UNITED STATES PATENT AND TRADEMARK OFFICE
CERTIFICATE OF CORRECTION

PATENT NO. : 5,009,818

DATED : April 23, 1991

INVENTOR(S) : Yuji Arai et al

It is certified that error appears in the above-identified patent and that said Letters Patent is hereby corrected as shown below:

Column 11, line 1; change "$0.05 \geqq \rho \geqq 0.6$" to ---$0.05 \leqq \rho \leqq 0.6$---.

Signed and Sealed this

Tenth Day of November, 1992

Attest:

DOUGLAS B. COMER

Attesting Officer

Acting Commissioner of Patents and Trademarks